US007966618B2

(12) United States Patent
Archer et al.

(10) Patent No.: US 7,966,618 B2
(45) Date of Patent: Jun. 21, 2011

(54) CONTROLLING DATA TRANSFERS FROM AN ORIGIN COMPUTE NODE TO A TARGET COMPUTE NODE

(75) Inventors: Charles J. Archer, Rochester, MN (US); Michael A. Blocksome, Rochester, MN (US); Joseph D. Ratterman, Rochester, MN (US); Brian E. Smith, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1057 days.

(21) Appl. No.: 11/754,765

(22) Filed: May 29, 2007

(65) Prior Publication Data
US 2008/0301704 A1 Dec. 4, 2008

(51) Int. Cl.
G06F 9/44 (2006.01)
(52) U.S. Cl. ........................................ 719/313; 719/310
(58) Field of Classification Search .................. 719/310, 719/313
See application file for complete search history.

(56) References Cited

U.S. PATENT DOCUMENTS

| | | | |
|---|---|---|---|
| 5,050,162 A | 9/1991 | Golestani | |
| 5,103,446 A * | 4/1992 | Fischer | 370/236 |
| 5,617,537 A | 4/1997 | Yamada et al. | |
| 5,680,116 A | 10/1997 | Hashimoto et al. | |
| 5,790,530 A | 8/1998 | Moh et al. | |
| 5,887,134 A * | 3/1999 | Ebrahim | 709/200 |
| 5,954,794 A | 9/1999 | Fishler et al. | |
| 6,070,189 A | 5/2000 | Bender et al. | |
| 6,072,781 A | 6/2000 | Feeney et al. | |
| 6,105,122 A | 8/2000 | Muller et al. | |
| 6,839,777 B1 * | 1/2005 | Vrancic et al. | 710/52 |
| 7,089,289 B1 | 8/2006 | Blackmore et al. | |
| 7,120,916 B1 | 10/2006 | Firth et al. | |
| 7,155,541 B2 | 12/2006 | Ganapathy et al. | |
| 7,779,173 B2 * | 8/2010 | Archer et al. | 710/22 |
| 2003/0233497 A1 | 12/2003 | Shih | |
| 2004/0107304 A1 * | 6/2004 | Grun | 710/36 |
| 2005/0033874 A1 | 2/2005 | Futral et al. | |
| 2005/0091334 A1 | 4/2005 | Chen et al. | |
| 2005/0114561 A1 | 5/2005 | Lu et al. | |
| 2005/0198113 A1 | 9/2005 | Mohamed et al. | |
| 2006/0045005 A1 | 3/2006 | Blackmore et al. | |
| 2006/0045109 A1 | 3/2006 | Blackmore et al. | |
| 2006/0047771 A1 | 3/2006 | Blackmore et al. | |
| 2006/0056405 A1 | 3/2006 | Chang et al. | |
| 2006/0075057 A1 | 4/2006 | Gildea et al. | |
| 2006/0206635 A1 | 9/2006 | Alexander et al. | |

(Continued)

OTHER PUBLICATIONS

Moreira, et al.,; The Blue Gene/L Supercomputer: A Hardware and Software Story; International Journal of Parallel Programming; Jun. 2007; pp. 181-206; vol. 35, No. 3; Springer Science+Business Media, LLC; USA.

(Continued)

*Primary Examiner* — Van H Nguyen
(74) *Attorney, Agent, or Firm* — Biggers & Ohanian, LLP

(57) ABSTRACT

Methods, apparatus, and products are disclosed for controlling data transfers from an origin compute node to a target compute node that include: receiving, by an application messaging module on the target compute node, an indication of a data transfer from an origin compute node to the target compute node; and administering, by the application messaging module on the target compute node, the data transfer using one or more messaging primitives of a system messaging module in dependence upon the indication.

3 Claims, 8 Drawing Sheets

U.S. PATENT DOCUMENTS

2006/0253619 A1 11/2006 Torudbakken et al.
2007/0041383 A1 2/2007 Banikazemi et al.
2008/0109573 A1 5/2008 Leonard et al.
2008/0222317 A1 9/2008 Go et al.
2009/0125604 A1 5/2009 Chang et al.
2009/0276582 A1 11/2009 Furtek et al.

OTHER PUBLICATIONS

Office Action, U.S. Appl. No. 11/764,302, Mail Date Jul. 28, 2010.
Office Action, U.S. Appl. No. 11/776,707, Mail Date Jul. 14, 2010.
Notice of Allowance, U.S. Appl. No. 11/746,333, Mail Date Jun. 23, 2010.
Notice of Allowance, U.S. Appl. No. 11/829,325, Mail Date May 21, 2010.
Notice of Allowance, U.S. Appl. No. 11/739,948, Mail Date Jul. 7, 2010.
Office Action, U.S. Appl. No. 11/740,361, Mail Date Apr. 30, 2010.
Office Action Dated Apr. 1, 2010 in U.S. Appl. No. 11/739,948.
Office Action Dated Feb. 5, 2010 in U.S. Appl. No. 11/746,333.
Office Action Dated Apr. 1, 2010 in U.S. Appl. No. 11/829,339.
Final Office Action Dated Mar. 8, 2010 in U.S. Appl. No. 11/829,334.
Final Office Action Dated Feb. 23, 2010 in U.S. Appl. No. 11/776,718.
U.S. Appl. No. 11/776,707, filed Jul. 12, 2007, Blocksome.
U.S. Appl. No. 11/739,948, filed Apr. 25, 2007, Blocksome, et al.
U.S. Appl. No. 11/740,361, filed Apr. 26, 2007, Archer, et al.
U.S. Appl. No. 11/746,333, filed May 9, 2007, Archer, et al.
U.S. Appl. No. 11/754,765, filed May 29, 2007, Archer, et al.
U.S. Appl. No. 11/764,302, filed Jun. 18, 2007, Archer, et al.
U.S. Appl. No. 11/755,501, filed May 29, 2007, Archer, et al.
U.S. Appl. No. 11/829,325, filed Jul. 27, 2007, Archer, et al.
U.S. Appl. No. 11/829,334, filed Jul. 27, 2007, Archer, et al.
U.S. Appl. No. 11/776,718, filed Jul. 12, 2007, Blocksome.
U.S. Appl. No. 11/829,339, filed Jul. 27, 2007, Blocksome.
Watson, Robert, "DMA Controller Programing in C," C Users Journal, v11n11, Nov. 1993, p. 35-50.
Office Action Dated May 26, 2009 in U.S. Appl. No. 11/829,325.
Office Action Dated Aug. 27, 2009 in U.S. Appl. No. 11/739,948.
Office Action Dated Sep. 1, 2009 in U.S. Appl. No. 11/776,718.
Office Action Dated Sep. 18, 2009 in U.S. Appl. No. 11/829,334.
Office Action Dated Sep. 15, 2009 in U.S. Appl. No. 11/829,339.
Office Action Dated Nov. 24, 2009 in U.S. Appl. No. 11/829,325.

* cited by examiner

US 7,966,618 B2

CONTROLLING DATA TRANSFERS FROM AN ORIGIN COMPUTE NODE TO A TARGET COMPUTE NODE

STATEMENT REGARDING FEDERALLY SPONSORED RESEARCH OR DEVELOPMENT

This invention was made with Government support under Contract No. B554331 awarded by the Department of Energy. The Government has certain rights in this invention.

BACKGROUND OF THE INVENTION

1. Field of the Invention

The field of the invention is data processing, or, more specifically, methods, apparatus, and products for controlling data transfers from an origin compute node to a target compute node.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Parallel computing is an area of computer technology that has experienced advances. Parallel computing is the simultaneous execution of the same task (split up and specially adapted) on multiple processors in order to obtain results faster. Parallel computing is based on the fact that the process of solving a problem usually can be divided into smaller tasks, which may be carried out simultaneously with some coordination.

Parallel computers execute parallel algorithms. A parallel algorithm can be split up to be executed a piece at a time on many different processing devices, and then put back together again at the end to get a data processing result. Some algorithms are easy to divide up into pieces. Splitting up the job of checking all of the numbers from one to a hundred thousand to see which are primes could be done, for example, by assigning a subset of the numbers to each available processor, and then putting the list of positive results back together. In this specification, the multiple processing devices that execute the individual pieces of a parallel program are referred to as 'compute nodes.' A parallel computer is composed of compute nodes and other processing nodes as well, including, for example, input/output ('I/O') nodes, and service nodes.

Parallel algorithms are valuable because it is faster to perform some kinds of large computing tasks via a parallel algorithm than it is via a serial (non-parallel) algorithm, because of the way modern processors work. It is far more difficult to construct a computer with a single fast processor than one with many slow processors with the same throughput. There are also certain theoretical limits to the potential speed of serial processors. On the other hand, every parallel algorithm has a serial part and so parallel algorithms have a saturation point. After that point adding more processors does not yield any more throughput but only increases the overhead and cost.

Parallel algorithms are designed also to optimize one more resource the data communications requirements among the nodes of a parallel computer. There are two ways parallel processors communicate, shared memory or message passing. Shared memory processing needs additional locking for the data and imposes the overhead of additional processor and bus cycles and also serializes some portion of the algorithm.

Message passing processing uses high-speed data communications networks and message buffers, but this communication adds transfer overhead on the data communications networks as well as additional memory need for message buffers and latency in the data communications among nodes. Designs of parallel computers use specially designed data communications links so that the communication overhead will be small but it is the parallel algorithm that decides the volume of the traffic.

Many data communications network architectures are used for message passing among nodes in parallel computers. Compute nodes may be organized in a network as a 'torus' or 'mesh,' for example. Also, compute nodes may be organized in a network as a tree. A torus network connects the nodes in a three-dimensional mesh with wrap around links. Every node is connected to its six neighbors through this torus network, and each node is addressed by its x, y, z coordinate in the mesh. In a tree network, the nodes typically are connected into a binary tree: each node has a parent, and two children (although some nodes may only have zero children or one child, depending on the hardware configuration). In computers that use a torus and a tree network, the two networks typically are implemented independently of one another, with separate routing circuits, separate physical links, and separate message buffers.

A torus network lends itself to point to point operations, but a tree network typically is inefficient in point to point communication. A tree network, however, does provide high bandwidth and low latency for certain collective operations, message passing operations where all compute nodes participate simultaneously, such as, for example, an allgather.

When a passing messages between compute nodes, the compute node attempting to transmit a message is referred to as the 'origin compute node,' while the compute node intended as the recipient of the message is referred to as the 'target compute node.' To transfer data through a data communications network from an origin compute node to a target compute node, an application running on the origin compute node typically calls a 'send' messaging function of the origin compute node's messaging software and an application running on the target compute node typically calls a 'receive' messaging function of the target compute node's messaging software. When the origin compute node's application calls the 'send' messaging function, the origin compute node's messaging software transmits a request to send ('RTS') message to the messaging software of the target compute node that indicates that the origin compute node has data to transfer to the target compute node. The target compute node's messaging software then responds to the origin compute node with a clear to send ('CTS') message indicating that the target compute node is ready to receive the data from the transfer. Upon receiving the CTS message, the origin compute node's messaging software then transfers the data to the target compute node. Because the application's call to the 'receive' messaging function specifies the storage location for the data on the target compute node, if the application of the target compute node has not yet called the 'receive' messaging function by the time that the target node receives the data from the transfer, the target compute node's messaging software stores the transferred data in a temporary message buffer and waits for the target compute node's application to call the 'receive' function. The drawback to this current method of data transfer is that often the target compute node does not have excess memory storage to allow the messaging software to store the data from the transfer in a temporary buffer while waiting for the target compute node's application to call the 'receive' messaging function. As such, readers will appreciate that room for improvement exists in controlling data transfers from an origin compute node to a target compute node.

SUMMARY OF THE INVENTION

Methods, apparatus, and products are disclosed for controlling data transfers from an origin compute node to a target compute node that include: receiving, by an application messaging module on the target compute node, an indication of a data transfer from an origin compute node to the target compute node; and administering, by the application messaging module on the target compute node, the data transfer using one or more messaging primitives of a system messaging module in dependence upon the indication.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
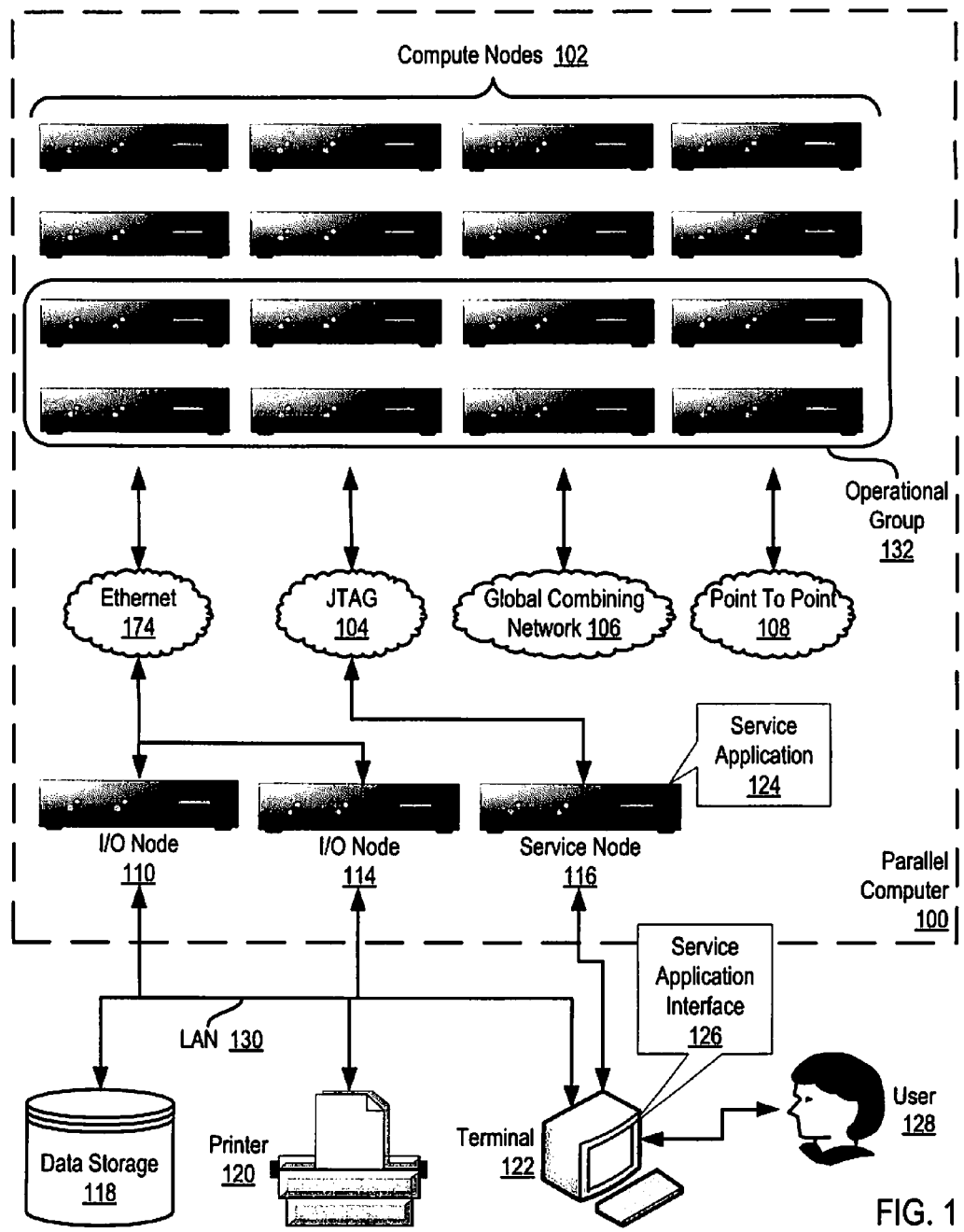
FIG. 1 illustrates an exemplary system for controlling data transfers from an origin compute node to a target compute node according to embodiments of the present invention.

Exemplary methods, apparatus, and computer program products for controlling data transfers from an origin compute node to a target compute node according to embodiments of the present invention are described with reference to the accompanying drawings, beginning with FIG. 1. FIG. 1 illustrates an exemplary system for controlling data transfers from an origin compute node to a target compute node according to embodiments of the present invention. The system of FIG. 1 includes a parallel computer (100), non-volatile memory for the computer in the form of data storage device (118), an output device for the computer in the form of printer (120), and an input/output device for the computer in the form of computer terminal (122). Parallel computer (100) in the example of FIG. 1 includes a plurality of compute nodes (102).

The compute nodes (102) are coupled for data communications by several independent data communications networks including a high speed Ethernet network (174), a Joint Test Action Group ('JTAG') network (104), a global combining network (106) which is optimized for collective operations, and a torus network (108) which is optimized point to point operations. The global combining network (106) is a data communications network that includes data communications links connected to the compute nodes so as to organize the compute nodes as a tree. Each data communications network is implemented with data communications links among the compute nodes (102). The data communications links provide data communications for parallel operations among the compute nodes of the parallel computer.

In addition, the compute nodes (102) of parallel computer are organized into at least one operational group (132) of compute nodes for collective parallel operations on parallel computer (100). An operational group of compute nodes is the set of compute nodes upon which a collective parallel operation executes. Collective operations are implemented with data communications among the compute nodes of an operational group. Collective operations are those functions that involve all the compute nodes of an operational group. A collective operation is an operation, a message-passing computer program instruction that is executed simultaneously, that is, at approximately the same time, by all the compute nodes in an operational group of compute nodes. Such an operational group may include all the compute nodes in a parallel computer (100) or a subset all the compute nodes. Collective operations are often built around point to point operations. A collective operation requires that all processes on all compute nodes within an operational group call the same collective operation with matching arguments. A 'broadcast' is an example of a collective operation for moving data among compute nodes of an operational group. A 'reduce' operation is an example of a collective operation that executes arithmetic or logical functions on data distributed among the compute nodes of an operational group. An operational group may be implemented as, for example, an MPI 'communicator.'

'MPI' refers to 'Message Passing Interface,' a prior art parallel communications library, a module of computer program instructions for data communications on parallel computers. Examples of prior-art parallel communications libraries that may be improved for use with systems according to embodiments of the present invention include MPI and the 'Parallel Virtual Machine' ('PVM') library. PVM was developed by the University of Tennessee, The Oak Ridge National Laboratory, and Emory University. MPI is promulgated by the MPI Forum, an open group with representatives from many organizations that define and maintain the MPI standard. MPI at the time of this writing is a de facto standard for communication among compute nodes running a parallel program on a distributed memory parallel computer. This specification sometimes uses MPI terminology for ease of explanation, although the use of MPI as such is not a requirement or limitation of the present invention.

Some collective operations have a single originating or receiving process running on a particular compute node in an operational group. For example, in a 'broadcast' collective operation, the process on the compute node that distributes the data to all the other compute nodes is an originating process. In a 'gather' operation, for example, the process on the compute node that received all the data from the other compute nodes is a receiving process. The compute node on which such an originating or receiving process runs is referred to as a logical root.

Most collective operations are variations or combinations of four basic operations: broadcast, gather, scatter, and reduce. The interfaces for these collective operations are defined in the MPI standards promulgated by the MPI Forum. Algorithms for executing collective operations, however, are not defined in the MPI standards. In a broadcast operation, all processes specify the same root process, whose buffer contents will be sent. Processes other than the root specify receive buffers. After the operation, all buffers contain the message from the root process.

In a scatter operation, the logical root divides data on the root into segments and distributes a different segment to each compute node in the operational group. In scatter operation, all processes typically specify the same receive count. The send arguments are only significant to the root process, whose buffer actually contains sendcount*N elements of a given data type, where N is the number of processes in the given group of compute nodes. The send buffer is divided and dispersed to all processes (including the process on the logical root). Each compute node is assigned a sequential identifier termed a 'rank.' After the operation, the root has sent sendcount data elements to each process in increasing rank order. Rank 0 receives the first sendcount data elements from the send buffer. Rank 1 receives the second sendcount data elements from the send buffer, and so on.

A gather operation is a many-to-one collective operation that is a complete reverse of the description of the scatter operation. That is, a gather is a many-to-one collective operation in which elements of a datatype are gathered from the ranked compute nodes into a receive buffer in a root node.

A reduce operation is also a many-to-one collective operation that includes an arithmetic or logical function performed on two data elements. All processes specify the same 'count' and the same arithmetic or logical function. After the reduction, all processes have sent count data elements from computer node send buffers to the root process. In a reduction operation, data elements from corresponding send buffer locations are combined pair-wise by arithmetic or logical operations to yield a single corresponding element in the root process's receive buffer. Application specific reduction operations can be defined at runtime. Parallel communications libraries may support predefined operations. MPI, for example, provides the following pre-defined reduction operations:

| | |
|---|---|
| MPI_MAX | maximum |
| MPI_MIN | minimum |
| MPI_SUM | sum |
| MPI_PROD | product |
| MPI_LAND | logical and |
| MPI_BAND | bitwise and |
| MPI_LOR | logical or |
| MPI_BOR | bitwise or |
| MPI_LXOR | logical exclusive or |
| MPI_BXOR | bitwise exclusive or |

In addition to compute nodes, the parallel computer (100) includes input/output ('I/O') nodes (110, 114) coupled to compute nodes (102) through one of the data communications networks (174). The I/O nodes (110, 114) provide I/O services between compute nodes (102) and I/O devices (118, 120, 122). I/O nodes (110, 114) are connected for data communications I/O devices (118, 120, 122) through local area network ('LAN') (130). The parallel computer (100) also includes a service node (116) coupled to the compute nodes through one of the networks (104). Service node (116) provides service common to pluralities of compute nodes, loading programs into the compute nodes, starting program execution on the compute nodes, retrieving results of program operations on the computer nodes, and so on. Service node (116) runs a service application (124) and communicates with users (128) through a service application interface (126) that runs on computer terminal (122).

As described in more detail below in this specification, the system of FIG. 1 operates generally to for controlling data transfers from an origin compute node to a target compute node according to embodiments of the present invention. Readers will note that the origin compute node is a compute node attempting to transmit a message, while the target compute node is a compute node intended as the recipient of the message. The system of FIG. 1 operates generally to for controlling data transfers from an origin compute node to a target compute node according to embodiments of the present invention by: receiving, by an application messaging module on the target compute node, an indication of a data transfer from an origin compute node to the target compute node; and administering, by the application messaging module on the target compute node, the data transfer using one or more messaging primitives of a system messaging module in dependence upon the indication.

The arrangement of nodes, networks, and I/O devices making up the exemplary system illustrated in FIG. 1 are for explanation only, not for limitation of the present invention. Data processing systems capable of controlling data transfers from an origin compute node to a target compute node according to embodiments of the present invention may include additional nodes, networks, devices, and architectures, not shown in FIG. 1, as will occur to those of skill in the art. Although the parallel computer (100) in the example of FIG. 1 includes sixteen compute nodes (102), readers will note that parallel computers capable of controlling data transfers from an origin compute node to a target compute node according to embodiments of the present invention may include any number of compute nodes. In addition to Ethernet and JTAG, networks in such data processing systems may support many data communications protocols including for example TCP (Transmission Control Protocol), IP (Internet Protocol), and others as will occur to those of skill in the art. Various embodiments of the present invention may be implemented on a variety of hardware platforms in addition to those illustrated in FIG. 1.

Controlling data transfers from an origin compute node to a target compute node according to embodiments of the present invention may be generally implemented on a parallel computer that includes a plurality of compute nodes. In fact, such computers may include thousands of such compute nodes. Each compute node is in turn itself a kind of computer composed of one or more computer processors, its own computer memory, and its own input/output adapters. For further explanation, therefore, FIG. 2 sets forth a block diagram of an exemplary compute node useful in a parallel computer capable of controlling data transfers from an origin compute node to a target compute node according to embodiments of the present invention. The compute node (152) of FIG. 2 includes one or more computer processors (164) as well as random access memory ('RAM') (156). The processors (164) are connected to RAM (156) through a high-speed memory bus (154) and through a bus adapter (194) and an extension bus (168) to other components of the compute node (152). Stored in RAM (156) is an application program (158), a module of computer program instructions that carries out parallel, user-level data processing using parallel algorithms. The application (158) of FIG. 2 allocates an application buffer for storing a message for transmission to another compute node.

Also stored RAM (156) is an application messaging module (160), a library of computer program instructions that carry out parallel communications among compute nodes, including point to point operations as well as collective operations. Application program (158) effects data communications with other application running on other compute nodes by calling software routines in the application messaging module (160). A library of parallel communications routines may be developed from scratch for use in systems according to embodiments of the present invention, using a traditional programming language such as the C programming language, and using traditional programming methods to write parallel communications routines that send and receive data among nodes on two independent data communications networks. Alternatively, existing prior art libraries may be improved to operate according to embodiments of the present invention. Examples of prior-art parallel communications libraries include the 'Message Passing Interface' ('MPI') library and the 'Parallel Virtual Machine' ('PVM') library.

Figure 2:
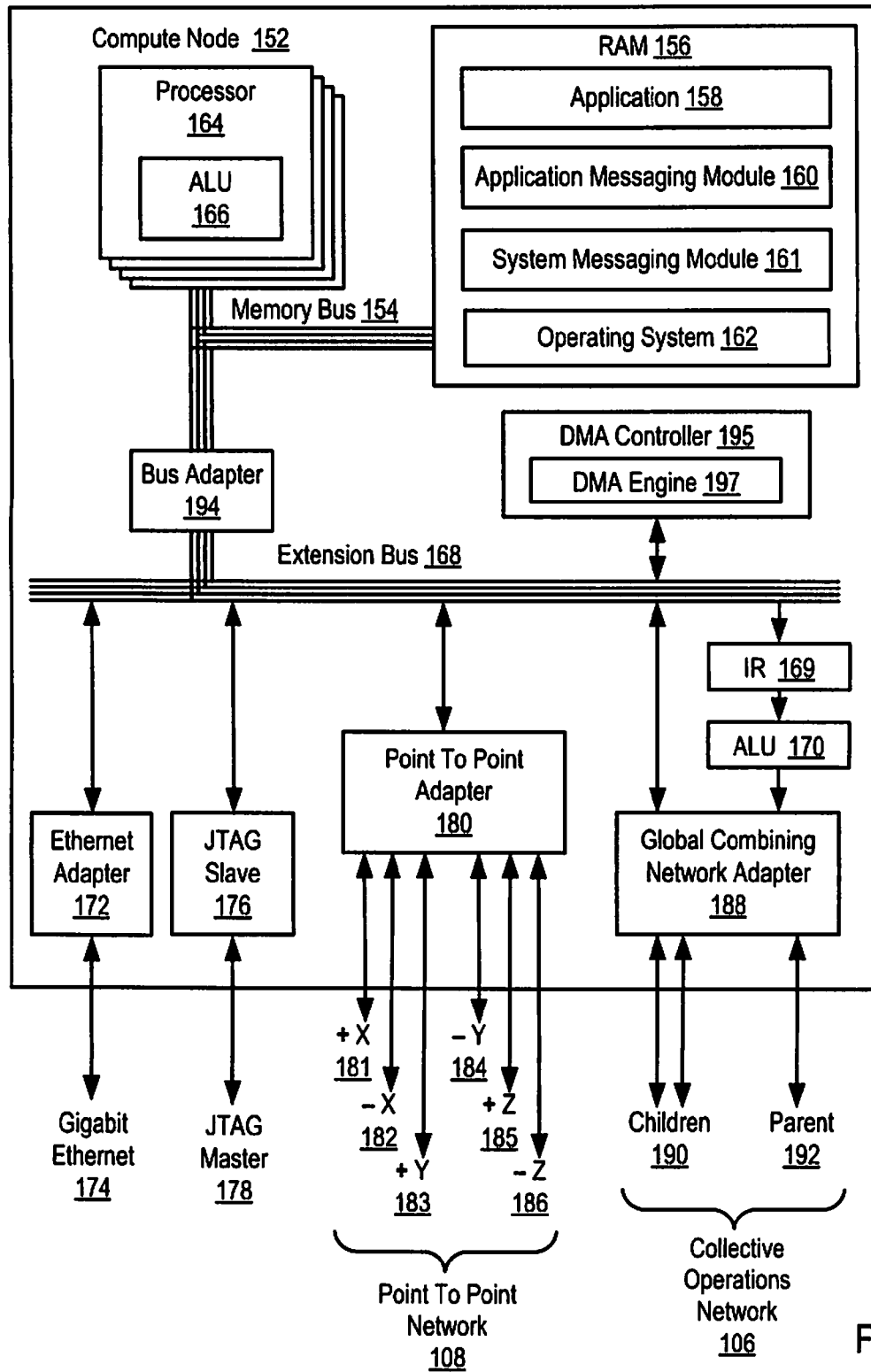
FIG. 2 sets forth a block diagram of an exemplary compute node useful in a parallel computer capable of controlling data transfers from an origin compute node to a target compute node according to embodiments of the present invention.

In the example of FIG. 2, the messaging module (160) operates generally for controlling data transfers from an origin compute node to a target compute node according to embodiments of the present invention. The messaging module (160) of FIG. 2 operates generally for controlling data transfers from an origin compute node to a target compute node according to embodiments of the present invention by: receiving, by an application messaging module on the target compute node, an indication of a data transfer from an origin compute node to the target compute node; and administering, by the application messaging module on the target compute node, the data transfer using one or more messaging primitives of a system messaging module (161) in dependence upon the indication.

Also stored in RAM (156) is a system messaging module (161) that implements system specific protocols for communications that support messaging for application (158) and the application messaging module (160). Such system specific protocols are typically invoked through a set of APIs that are exposed to the application messaging module (160). Such system specific protocols used for communications in the system messaging module (161) are typically isolated from the application (158) through the application messaging module (160), thus making the interface provided to the application (158) somewhat independent of system specific details implemented in the system messaging module (161). The system messaging module (161) of FIG. 2 implements system specific communications protocols using a set of messaging primitives. A messaging primitive is a data communications operation that serves as a basic building block for communicating between compute nodes. A message primitive may be implemented as, for example, a request to send ('RTS') operation that send a RTS control message to a compute node, a clear to send ('CTS') operation that sends a CTS control message to a compute node, a remote get operation that transfers data from one compute node to another, a memory FIFO operation that transfers data from one compute node to another, an acknowledgement operation that sends an acknowledgement message to a compute node, and so on. Combining a number of messaging primitives together forms the basis for developing a communications protocol. In carrying out system specific communications protocols, the system messaging module (161) typically accesses communications hardware and software useful according to the present invention such as, for example, DMA controller (195), DMA engine (197), and data communications adapters (180, 188).

Also stored in RAM (156) is an operating system (162), a module of computer program instructions and routines for an application program's access to other resources of the compute node. It is typical for an application program and parallel communications library in a compute node of a parallel computer to run a single thread of execution with no user login and no security issues because the thread is entitled to complete access to all resources of the node. The quantity and complexity of tasks to be performed by an operating system on a compute node in a parallel computer therefore are smaller and less complex than those of an operating system on a serial computer with many threads running simultaneously. In addition, there is no video I/O on the compute node (152) of FIG. 2, another factor that decreases the demands on the operating system. The operating system may therefore be quite lightweight by comparison with operating systems of general purpose computers, a pared down version as it were, or an operating system developed specifically for operations on a particular parallel computer. Operating systems that may usefully be improved, simplified, for use in a compute node include UNIX™, Linux™, Microsoft XP™, AIX™, IBM's i5/OS™, and others as will occur to those of skill in the art.

The exemplary compute node (152) of FIG. 2 includes several communications adapters (172, 176, 180, 188) for implementing data communications with other nodes of a parallel computer. Such data communications may be carried out serially through RS-232 connections, through external buses such as USB, through data communications networks such as IP networks, and in other ways as will occur to those of skill in the art. Communications adapters implement the hardware level of data communications through which one computer sends data communications to another computer, directly or through a network. Examples of communications adapters useful in systems for controlling data transfers from an origin compute node to a target compute node according to embodiments of the present invention include modems for wired communications, Ethernet (IEEE 802.3) adapters for wired network communications, and 802.11b adapters for wireless network communications.

The data communications adapters in the example of FIG. 2 include a Gigabit Ethernet adapter (172) that couples example compute node (152) for data communications to a Gigabit Ethernet (174). Gigabit Ethernet is a network transmission standard, defined in the IEEE 802.3 standard, that provides a data rate of 1 billion bits per second (one gigabit).

Gigabit Ethernet is a variant of Ethernet that operates over multimode fiber optic cable, single mode fiber optic cable, or unshielded twisted pair.

The data communications adapters in the example of FIG. 2 includes a JTAG Slave circuit (176) that couples example compute node (152) for data communications to a JTAG Master circuit (178). JTAG is the usual name used for the IEEE 1149.1 standard entitled Standard Test Access Port and Boundary-Scan Architecture for test access ports used for testing printed circuit boards using boundary scan. JTAG is so widely adapted that, at this time, boundary scan is more or less synonymous with JTAG. JTAG is used not only for printed circuit boards, but also for conducting boundary scans of integrated circuits, and is also useful as a mechanism for debugging embedded systems, providing a convenient "back door" into the system. The example compute node of FIG. 2 may be all three of these: It typically includes one or more integrated circuits installed on a printed circuit board and may be implemented as an embedded system having its own processor, its own memory, and its own I/O capability. JTAG boundary scans through JTAG Slave (176) may efficiently configure processor registers and memory in compute node (152) for use in controlling data transfers from an origin compute node to a target compute node according to embodiments of the present invention.

The data communications adapters in the example of FIG. 2 includes a Point To Point Adapter (180) that couples example compute node (152) for data communications to a network (108) that is optimal for point to point message passing operations such as, for example, a network configured as a three-dimensional torus or mesh. Point To Point Adapter (180) provides data communications in six directions on three communications axes, x, y, and z, through six bidirectional links: +x (181), −x (182), +y (183), −y (184), +z (185), and −z (186).

The data communications adapters in the example of FIG. 2 includes a Global Combining Network Adapter (188) that couples example compute node (152) for data communications to a network (106) that is optimal for collective message passing operations on a global combining network configured, for example, as a binary tree. The Global Combining Network Adapter (188) provides data communications through three bidirectional links: two to children nodes (190) and one to a parent node (192).

Example compute node (152) includes two arithmetic logic units ('ALUs'). ALU (166) is a component of processor (164), and a separate ALU (170) is dedicated to the exclusive use of Global Combining Network Adapter (188) for use in performing the arithmetic and logical functions of reduction operations. Computer program instructions of a reduction routine in parallel communications library (160) may latch an instruction for an arithmetic or logical function into instruction register (169). When the arithmetic or logical function of a reduction operation is a 'sum' or a 'logical or,' for example, Global Combining Network Adapter (188) may execute the arithmetic or logical operation by use of ALU (166) in processor (164) or, typically much faster, by use dedicated ALU (170).

The example compute node (152) of FIG. 2 includes a direct memory access ('DMA') controller (195), which is computer hardware for direct memory access and a DMA engine (195), which is computer software for direct memory access. Direct memory access includes reading and writing to memory of compute nodes with reduced operational burden on the central processing units (164). A DMA transfer essentially copies a block of memory from one compute node to another. While the CPU may initiates the DMA transfer, the CPU does not execute it. In the example of FIG. 2, the DMA engine (195) and the DMA controller (195) support the system messaging module (161), and thereby the application message module (160), for controlling data transfers from an origin compute node to a target compute node according to embodiments of the present invention.

Figure 3A:
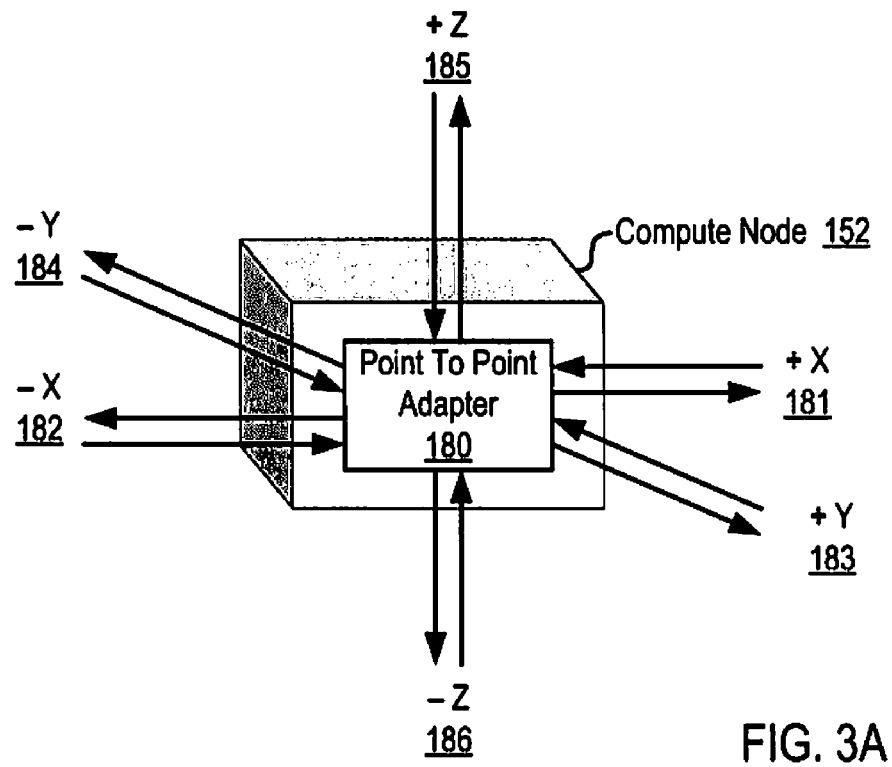
FIG. 3A illustrates an exemplary Point To Point Adapter useful in systems capable of controlling data transfers from an origin compute node to a target compute node according to embodiments of the present invention.

For further explanation, FIG. 3A illustrates an exemplary Point To Point Adapter (180) useful in systems capable of controlling data transfers from an origin compute node to a target compute node according to embodiments of the present invention. Point To Point Adapter (180) is designed for use in a data communications network optimized for point to point operations, a network that organizes compute nodes in a three-dimensional torus or mesh. Point To Point Adapter (180) in the example of FIG. 3A provides data communication along an x-axis through four unidirectional data communications links, to and from the next node in the −x direction (182) and to and from the next node in the +x direction (181). Point To Point Adapter (180) also provides data communication along a y-axis through four unidirectional data communications links, to and from the next node in the −y direction (184) and to and from the next node in the +y direction (183). Point To Point Adapter (180) in FIG. 3A also provides data communication along a z-axis through four unidirectional data communications links, to and from the next node in the −z direction (186) and to and from the next node in the +z direction (185).

Figure 3B:
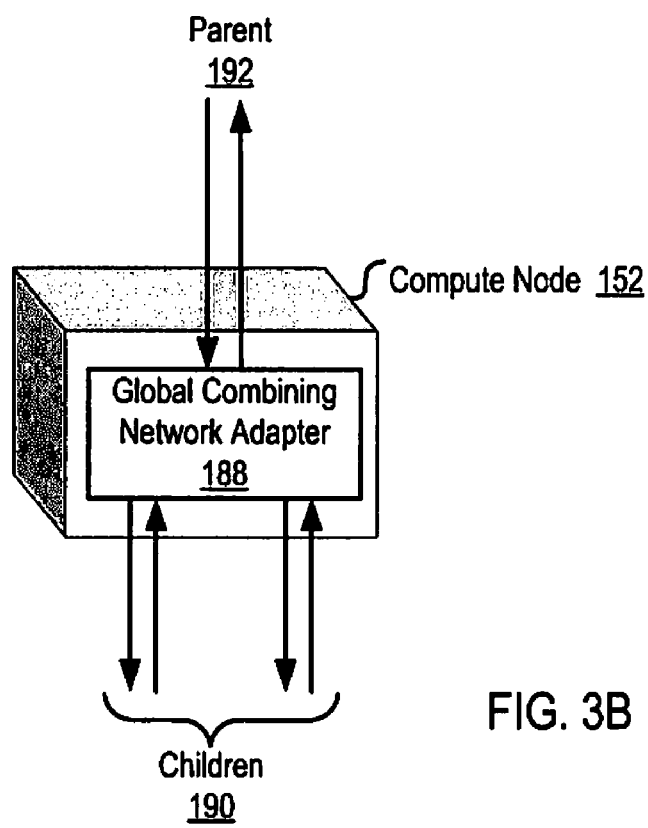
FIG. 3B illustrates an exemplary Global Combining Network Adapter useful in systems capable of controlling data transfers from an origin compute node to a target compute node according to embodiments of the present invention.

For further explanation, FIG. 3B illustrates an exemplary Global Combining Network Adapter (188) useful in systems capable of controlling data transfers from an origin compute node to a target compute node according to embodiments of the present invention. Global Combining Network Adapter (188) is designed for use in a network optimized for collective operations, a network that organizes compute nodes of a parallel computer in a binary tree. Global Combining Network Adapter (188) in the example of FIG. 3B provides data communication to and from two children nodes through four unidirectional data communications links (190). Global Combining Network Adapter (188) also provides data communication to and from a parent node through two unidirectional data communications links (192).

Figure 4:
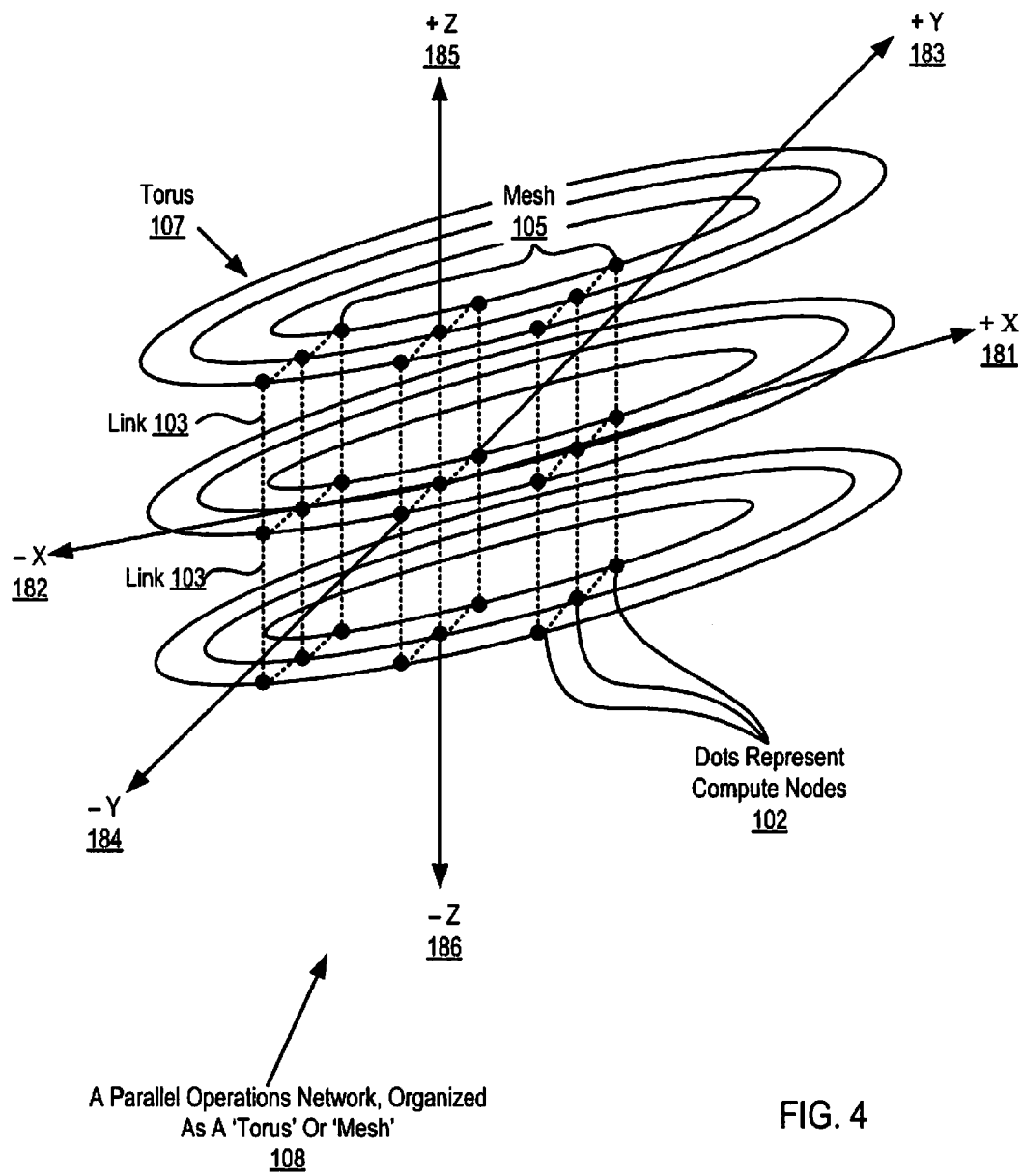
FIG. 4 sets forth a line drawing illustrating an exemplary data communications network optimized for point to point operations useful in systems capable of controlling data transfers from an origin compute node to a target compute node in accordance with embodiments of the present invention.

For further explanation, FIG. 4 sets forth a line drawing illustrating an exemplary data communications network (108) optimized for point to point operations useful in systems capable of controlling data transfers from an origin compute node to a target compute node in accordance with embodiments of the present invention. In the example of FIG. 4, dots represent compute nodes (102) of a parallel computer, and the dotted lines between the dots represent data communications links (103) between compute nodes. The data communications links are implemented with point to point data communications adapters similar to the one illustrated for example in FIG. 3A, with data communications links on three axes, x, y, and z, and to and fro in six directions +x (181), −x (182), +y (183), −y (184), +z (185), and −z (186). The links and compute nodes are organized by this data communications network optimized for point to point operations into a three dimensional mesh (105). The mesh (105) has wrap-around links on each axis that connect the outermost compute nodes in the mesh (105) on opposite sides of the mesh (105). These wrap-around links form part of a torus (107). Each compute node in the torus has a location in the torus that is uniquely specified by a set of x, y, z coordinates. Readers will note that the wrap-around links in the y and z directions have been omitted for clarity, but are configured in a similar manner to the wrap-around link illustrated in the x direction. For clarity of explanation, the data communications network of FIG. 4 is illustrated with only 27 compute nodes, but readers will recognize that a data communications network optimized for point to point operations for use in controlling data transfers from an origin compute node to a target compute node in accordance with embodiments of the present invention may contain only a few compute nodes or may contain thousands of compute nodes.

Figure 5:
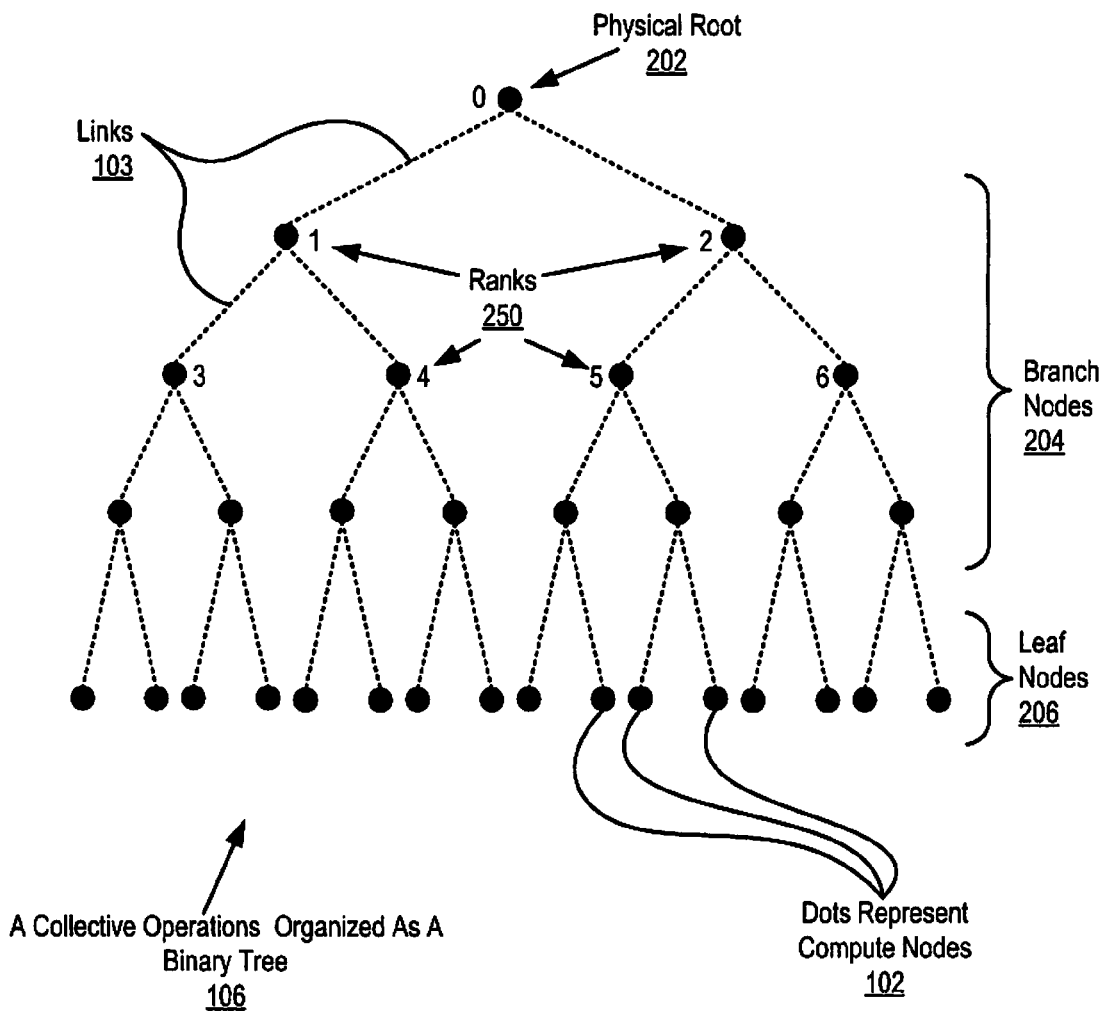
FIG. 5 sets forth a line drawing illustrating an exemplary data communications network optimized for collective operations useful in systems capable of controlling data transfers from an origin compute node to a target compute node in accordance with embodiments of the present invention.

For further explanation, FIG. 5 sets forth a line drawing illustrating an exemplary data communications network (106) optimized for collective operations useful in systems capable of controlling data transfers from an origin compute node to a target compute node in accordance with embodiments of the present invention. The example data communications network of FIG. 5 includes data communications links connected to the compute nodes so as to organize the compute nodes as a tree. In the example of FIG. 5, dots represent compute nodes (102) of a parallel computer, and the dotted lines (103) between the dots represent data communications links between compute nodes. The data communications links are implemented with global combining network adapters similar to the one illustrated for example in FIG. 3B, with each node typically providing data communications to and from two children nodes and data communications to and from a parent node, with some exceptions. Nodes in a binary tree (106) may be characterized as a physical root node (202), branch nodes (204), and leaf nodes (206). The root node (202) has two children but no parent. The leaf nodes (206) each has a parent, but leaf nodes have no children. The branch nodes (204) each has both a parent and two children. The links and compute nodes are thereby organized by this data communications network optimized for collective operations into a binary tree (106). For clarity of explanation, the data communications network of FIG. 5 is illustrated with only 31 compute nodes, but readers will recognize that a data communications network optimized for collective operations for use in systems for controlling data transfers from an origin compute node to a target compute node in accordance with embodiments of the present invention may contain only a few compute nodes or may contain thousands of compute nodes.

In the example of FIG. 5, each node in the tree is assigned a unit identifier referred to as a 'rank' (250). A node's rank uniquely identifies the node's location in the tree network for use in both point to point and collective operations in the tree network. The ranks in this example are assigned as integers beginning with 0 assigned to the root node (202), 1 assigned to the first node in the second layer of the tree, 2 assigned to the second node in the second layer of the tree, 3 assigned to the first node in the third layer of the tree, 4 assigned to the second node in the third layer of the tree, and so on. For ease of illustration, only the ranks of the first three layers of the tree are shown here, but all compute nodes in the tree network are assigned a unique rank.

Figure 6:
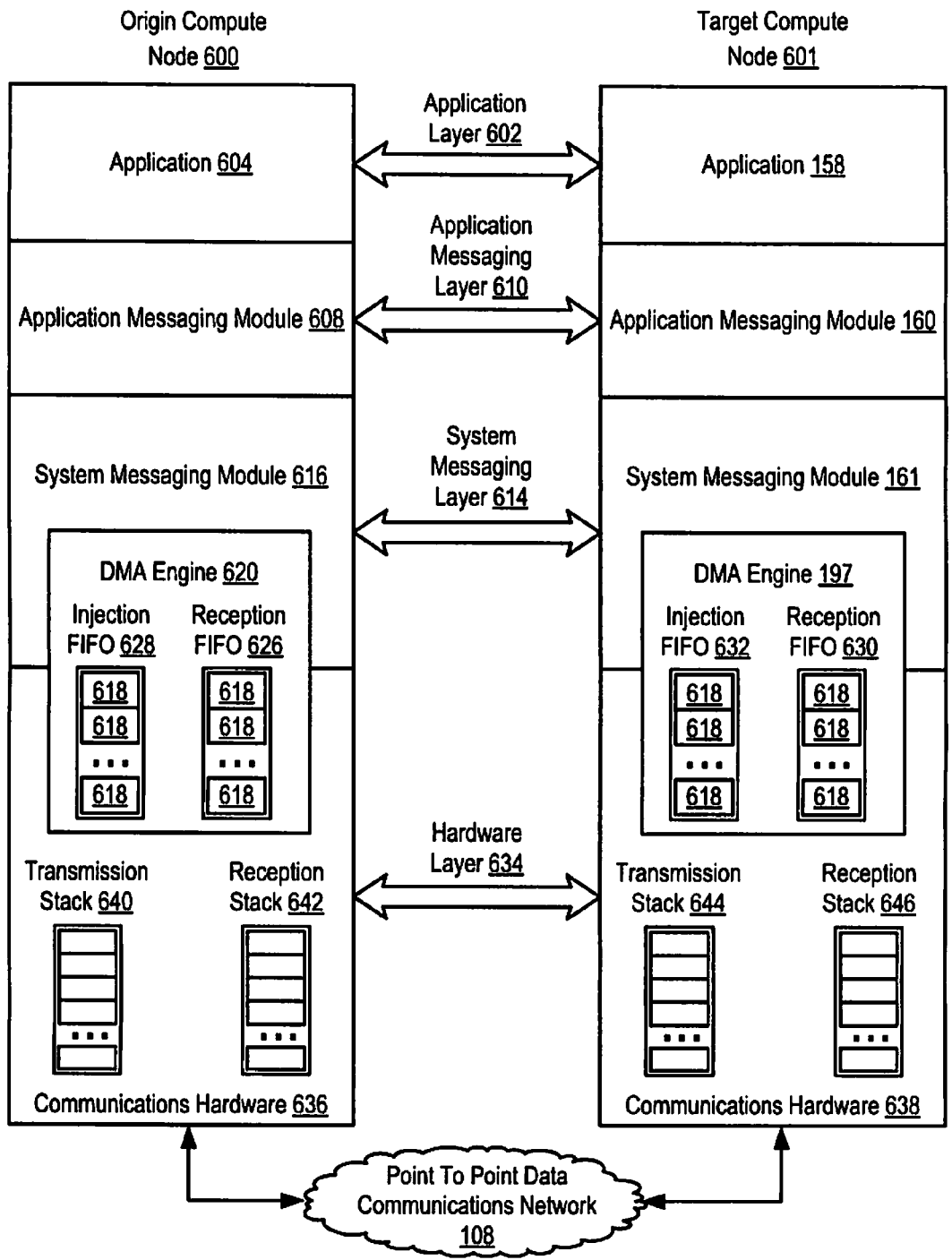
FIG. 6 sets forth a block diagram illustrating an exemplary communications architecture illustrated as a protocol stack useful in controlling data transfers from an origin compute node to a target compute node according to embodiments of the present invention.

For further explanation, FIG. 6 sets forth a block diagram illustrating an exemplary communications architecture illustrated as a protocol stack useful in controlling data transfers from an origin compute node to a target compute node according to embodiments of the present invention. The exemplary communications architecture of FIG. 6 sets forth two compute nodes, an origin compute node (600) and a target compute node (601). Only two compute nodes are illustrated in the example of FIG. 6 for ease of explanation and not for limitation. In fact, controlling data transfers from an origin compute node to a target compute node according to embodiments of the present invention may be implemented using many compute nodes in very large scale computer systems such as parallel computers with thousands of nodes.

The exemplary communications architecture of FIG. 6 includes an application layer (602) composed of application (604) installed on the origin compute node (600) and application (158) installed on the target compute node (601). Data communications between applications (604, 158) are effected using application messaging modules (608, 160) installed on each of the compute nodes (600, 601). Applications (604, 158) may communicate messages by invoking function of an application programming interfaces ('API') exposed by the application messaging modules (608 and 160). For the origin compute node's application (604) to transmit messages to the target compute node's application (158), the origin compute node's application (604) typically calls a 'send' messaging function of the application messaging module (608), while the target compute node's application (158) typically calls a 'receive' messaging function of the application messaging module (160). Each application (604 and 158) provides match data to their respective application messaging module (608 and 160), the origin compute node's application (604) providing origin match data and the target compute node's application (158) providing target match data.

Match data is the data used by the application messaging layer (610) to match the 'send' function called by the origin compute node's application (604) with the 'receive' function called by the target compute node's application (158) so that the data specified in the 'send' function is stored in the location specified in the 'receive' function. Match data may be implemented, for example, as a data structure specifying the origin compute node's unique rank in the operational group, a tag number provided by the application, and a context that identifies the particular operational group of compute nodes involved in the transfer. Match data provided to the origin compute node's application messaging module (608) is referred to as origin match data, while the match data provided to the target compute node's application messaging module (160) is referred to as target match data.

The exemplary communications architecture of FIG. 6 includes an application messaging layer (610) that provides a hardware-independent messaging interface that supports messaging in the application layer (602). Such a messaging interface is typically utilized by applications (604 and 158) in the application layer (602) through a set of APIs exposed by application messaging modules. In the example of FIG. 6, the messaging layer (610) is composed of an application messaging module (608) installed on the origin compute node (600) and an application messaging module (160) installed on the target compute node (601). In the example of FIG. 6, the application messaging module (160) operates for controlling data transfers from an origin compute node to a target compute node according to embodiments of the present invention. The application messaging module (160) on the target compute node (601) receives an indication of a data transfer from the origin compute node (600) to the target compute node (601) and administers the data transfer using one or more messaging primitives of a system messaging module.

The exemplary communications architecture of FIG. 6 includes a system messaging layer (614) that implements hardware-specific protocols for communications that support messaging in the application layer (602) and the application messaging layer (610). Such system specific protocols are typically invoked through a set of APIs that are exposed to the application messaging layer (610). Such system specific protocols used for communications in the system messaging layer (614) are typically isolated from the application layer (602) through the application messaging layer (610), thus making the interface provided to the application layer (602)

somewhat independent of system-specific details implemented in the system messaging layer (614). In the example of FIG. 6, the system messaging layer (614) is composed of a system messaging module (616) installed on the origin compute node (600) and a system messaging module (161) installed on the target compute node (601).

The system messaging layer (614) of FIG. 2 implements system specific communications protocols using a set of messaging primitives. A messaging primitive is a data communications operation that serves as a basic building block for communicating between compute nodes. A message primitive may be implemented as, for example, a request to send ('RTS') operation that send a RTS control message to a compute node, a clear to send ('CTS') operation that sends a CTS control message to a compute node, a remote get operation that transfers data from one compute node to another, a memory FIFO operation that transfers data from one compute node to another, an acknowledgement operation that sends an acknowledgement message to a compute node, and so on. Combining a number of messaging primitives together forms the basis for developing a communications protocol. In carrying out system specific communications protocols, the system messaging layer (614) typically accesses communications hardware and software useful according to the present invention such as, for example, DMA controllers, DMA engines, data communications hardware, and so on.

The exemplary communications architecture of FIG. 6 also includes a hardware layer (634) that defines the physical implementation and the electrical implementation of aspects of the hardware on the compute nodes such as the bus, network cabling, connector types, physical data rates, data transmission encoding and may other factors for communications between the compute nodes (600 and 601) on the physical network medium. The hardware layer (634) of FIG. 6 is composed of communications hardware (636) of the origin compute node (600), communications hardware (638) of the target compute node (601), and the data communications network (108) connecting the origin compute node (600) to the target compute node (601). Such communications hardware may include, for example, point-to-point adapters and DMA controllers as described above with reference to FIGS. 2 and 3A. In the example of FIG. 6, the communications hardware (636 and 638) each include a transmission stack (640 and 644) for storing network packets for transmission to other communications hardware through the data communications network (108), and each include a reception stack (642 and 646) for storing network packets received from other communications hardware through the data communications network (108).

The exemplary communications architecture of FIG. 6 illustrates a DMA engine (620) for the origin compute node (600) and a DMA engine (197) for the target compute node (601). The DMA engines (620 and 197) in the example of FIG. 6 are illustrated in both the system messaging layer (614) and the hardware layer (634). The DMA engines (620 and 197) are shown in both the system messaging layer (614) and the hardware layer (634) because a DMA engine useful in embodiments of the present invention may often provide system messaging layer interfaces and also implement communications according to some aspects of the communication hardware layer (634). The exemplary DMA engines (620 and 197) of FIG. 6 each include an injection FIFO buffer (628 and 632) for storing data descriptors (618) for messages to be sent to other DMA engines on other compute nodes using a memory FIFO data transfer operation or direct put data transfer operation. The exemplary DMA engines (620 and 197) of FIG. 6 each also include a reception FIFO buffer (626 and 630) for storing data descriptors (618) for messages received from other DMA engines on other compute nodes. Although FIG. 6 only illustrates a single injection FIFO buffer and a single reception FIFO buffer, readers will note that a DMA engine may have access to any number of injection FIFO buffers and reception FIFO buffers for carrying out data transfers from an origin compute node to a target compute node according to embodiments of the present invention.

A memory FIFO data transfer operation is a mode of transferring data using a DMA engine on an origin node and a DMA engine on a target node. In a memory FIFO data transfer operation, data is transferred along with a data descriptor describing the data from an injection FIFO for the origin DMA engine to a target DMA engine. The target DMA engine in turns places the descriptor in the reception FIFO and caches the data. A core processor then retrieves the data descriptor from the reception FIFO and processes the data in cache either by instructing the DMA to store the data directly or carrying out some processing on the data, such as even storing the data by the core processor.

A direct put operation is a mode of transferring data using a DMA engine on an origin node and a DMA engine on a target node. A direct put operation allows data to be transferred and stored on the target compute node with little or no involvement from the target node's processor. To effect minimal involvement from the target node's processor in the direct put operation, the origin DMA transfers the data to be stored on the target compute node along with a specific identification of a storage location on the target compute node. The origin DMA knows the specific storage location on the target compute node because the specific storage location for storing the data on the target compute node has been previously provided by the target DMA to the origin DMA.

Figure 7:
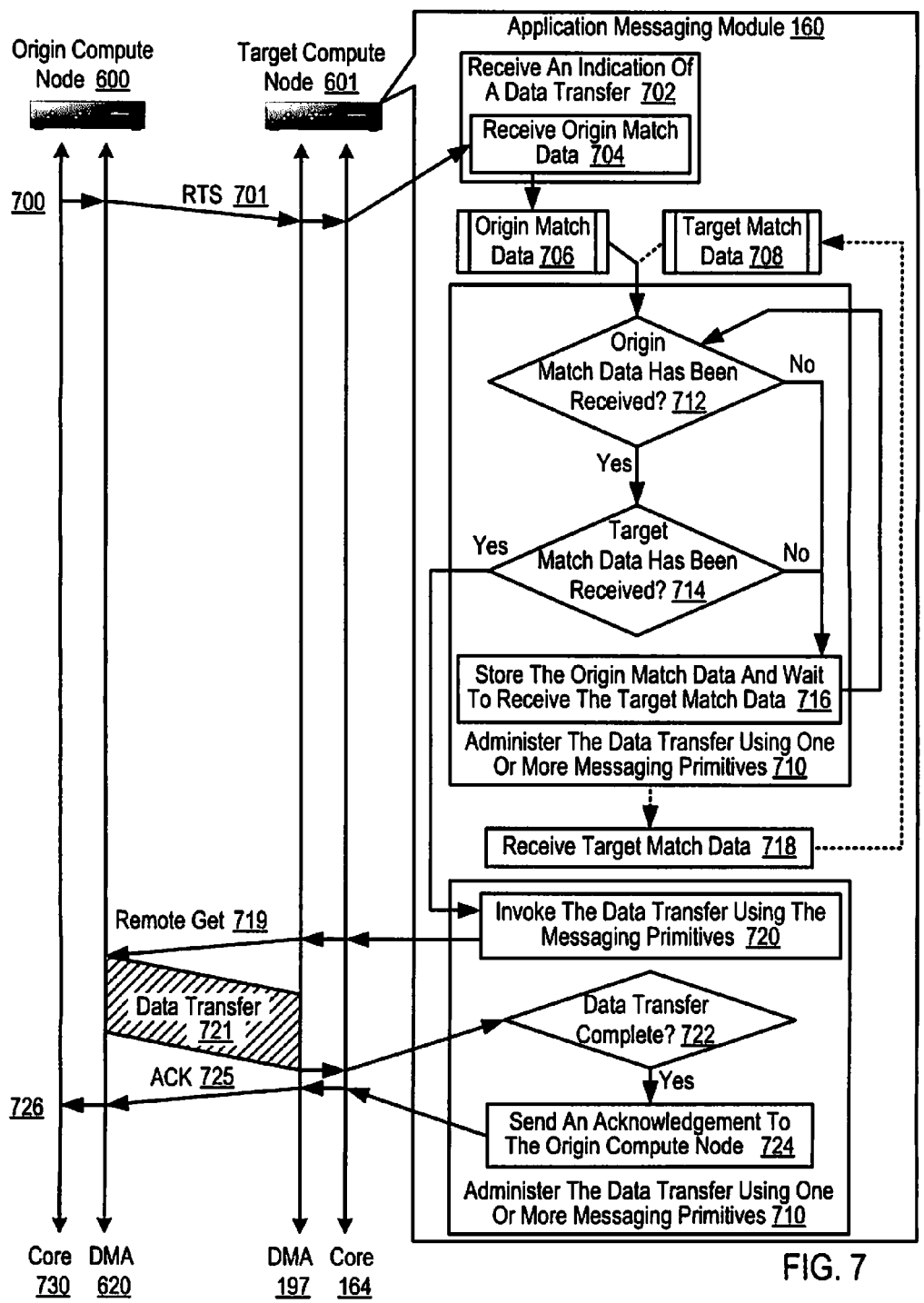
FIG. 7 sets forth a flow chart illustrating an exemplary method for controlling data transfers from an origin compute node to a target compute node according to the present invention.

For further explanation, FIG. 7 sets forth a flow chart illustrating an exemplary method for controlling data transfers from an origin compute node (600) to a target compute node (601) according to the present invention. The origin compute node (600) of FIG. 7 includes a processing core (730) and DMA engine (620), and the target compute node (601) of FIG. 7 includes a processing core (164) and DMA engine (197).

The method of FIG. 7 includes receiving (702), by an application messaging module (160) on the target compute node (601), an indication of a data transfer (721) from an origin compute node (600) to the target compute node (601). The application messaging module (160) on the target compute node (601) may receive (702) an indication of a data transfer (721) from an origin compute node (600) to the target compute node (601) according to the method of FIG. 7 by receiving (704) origin match data (706) from the origin compute node (600). Receiving (704) the origin match data (706) from the origin compute node (600) serves as an indication of a data transfer (721) from an origin compute node (600) to the target compute node (601) because the origin match data (706) is typically only sent to the target compute node (601) when an application on the origin compute node (600) initiates a data transfer by calling a 'send' messaging function with the origin match data (706) as a parameter.

Match data is the data used by the application messaging module (160) to match the 'send' function called by an application on the origin compute node (600) with the 'receive' function called by an application on the target compute node (601) so that the data specified in the 'send' function for transfer is stored in the location on the target compute node (601) specified in the 'receive' function. Match data may be implemented, for example, as a data structure specifying the origin compute node's unique rank in the operational group, a tag number provided by the application, and a context that identifies the particular operational group of compute nodes involved in the transfer. Match data provided by the application on the origin compute node (600) is referred to as origin match data, while the match data provided by the application on the target compute node (601) is referred to as target match data.

In the method of FIG. 7, the application messaging module (160) on the target compute node (601) may receive (704) the origin match data (706) from the origin compute node (600) according to the method of FIG. 7 in a Request To Send ('RTS') message (701). The RTS message (701) of FIG. 7 is a control message indicating that the origin compute node (600) has data to transfer to the target compute node (601). The RTS message (701) is transmitted (700) by the origin compute node (600) to the target compute node (601) in response to an application on the origin compute node (600) calling a 'send' messaging function to transfer data to an application on the target compute node (601). The 'send' messaging function specifies the origin match data (706) along with other information describing the location on the origin compute node (600) of the data to be transferred to the target compute node (601).

Readers will note that at this point in the method of FIG. 7, the origin match data (706) has been received in the application messaging module (160) of the target compute node (601). As indicated by the dotted arrows, however, the target match data (708) has not yet been received in the application messaging module (160) on the target compute node (601) at this point in the method of FIG. 7 because the application on the target compute node (601) has not yet called the 'receive' messaging function, which specifies both the target match data and the location on the target compute node (601) to store the data to be transferred from the origin compute node (600).

The method of FIG. 7 includes administering (710), by the application messaging module on the target compute node (601), the data transfer (721) using one or more messaging primitives of a system messaging module in dependence upon the indication. As mentioned above, the system messaging module is a set of computer program instructions that implements system specific protocols for communications that support messaging for the application messaging module (160). Such system specific protocols are typically invoked through a set of APIs that are exposed to the application messaging module (160). A system messaging module typically implements system specific communications protocols for the application messaging module (160) using a set of messaging primitives. A messaging primitive is a data communications operation that serves as a basic building block for communicating between compute nodes. A message primitive may be implemented as, for example, a request to send ('RTS') operation that send a RTS control message to a compute node, a clear to send ('CTS') operation that sends a CTS control message to a compute node, a remote get operation that transfers data from one compute node to another, a memory FIFO operation that transfers data from one compute node to another, an acknowledgement operation that sends an acknowledgement message to a compute node, and so on. Combining a number of messaging primitives together forms the basis for developing a communications protocol.

The application messaging module (160) on the target compute node (601) administers (710) the data transfer (721) in the method of FIG. 7 by determining (712) whether the origin match data (706) has been received by the application messaging module (160) on the target compute node (601). As mentioned above, the application messaging module (160) may determine (712) whether the origin match data (706) has been received by the application messaging module (160) on the target compute node (601) according to the method of FIG. 7 by identifying whether the target compute node (601) has received an RTS message (701) from the origin compute node (600) that contains the origin match data (706). If the target compute node (601) has not received the RTS message (701), then the origin match data (706) has not been received by the application messaging module (160) on the target compute node (601). The origin match data (706), however, has been received by the application messaging module (160) on the target compute node (601) if the target compute node (601) has received the RTS message (701).

The application messaging module (160) on the target compute node (601) also administers (710) the data transfer (721) in the method of FIG. 7 by determining (714) whether the target match data (708) has been received by the application messaging module (160) on the target compute node (601). As mentioned above, the application messaging module (160) may determine (714) whether the target match data (708) has been received by the application messaging module (160) on the target compute node (601) according to the method of FIG. 7 by identifying whether the application on the target compute node (601) has called the 'receive' messaging function. If the application on the target compute node (601) has not called the 'receive' messaging function, then the target match data (708) has not been received by the application messaging module (160) on the target compute node (601). If the application on the target compute node (601) has called the 'receive' messaging function, however, then the target match data (708) has been received by the application messaging module (160) on the target compute node (601).

If the origin match data (706) has been received by the application messaging module and the target match data (708) has not been received by the application messaging module, the application messaging module (160) on the target compute node (601) administers (710) the data transfer (721) in the method of FIG. 7 by storing (716) the origin match data (706) on the target compute node (601) and waiting to receive the target match data (708). The application messaging module (160) may store (716) the origin match data (706) in a pending transfer queue along with the information describing the location on the origin compute node (600) of the data to be transferred while the application messaging module (160) waits to receive the target match data (708) from the application on the target compute node (601).

After some time passes, the method of FIG. 7 continues with receiving (718), by the application messaging module (160), the target match data (708) from the application on the target compute node (601). Again, the application messaging module (160) may receive (718) the target match data (708) when the application on the target compute node (601) calls the 'receive' messaging function, which specifies the target match data (708) and the location on the target compute node (601) for storing the data to be transferred from the origin compute node (600).

When the origin match data (706) has been received by the application messaging module and the target match data (708) has been received by the application messaging module, the application messaging module (160) on the target compute node (601) administers (710) the data transfer (721) in the method of FIG. 7 by invoking (720) the data transfer (721) from the origin compute node (600) to the target compute node (601) using the messaging primitives. The application messaging module (160) may invoke (720) the data transfer (721) according to the method of FIG. 7 by invoking a remote get operation in the system messaging module of the target compute node (601) to carry out the data transfer (721).

A remote get operation is an operation that allows a compute node to retrieve data from another compute node without involving the processor on the compute node providing the data. In the method of FIG. 7, invoking a remote get operation causes the target compute node (601) to transmit a remote get message (719) to the DMA engine (620) of the origin compute node (600). The remote get message (719) of FIG. 7 may include the target match data (708) to allow the target compute node's application messaging module (160) to identify to which remote get operation the returned data corresponds. The remote get message (719) of FIG. 7 typically specifies the location on the origin compute node (600) where the data to be transferred is stored and specifies where the transferred data may be stored on the target compute node (601) by the DMA engine (197) as the data arrives on the target compute node (601). Upon receiving the remote get message (719), the DMA engine (620) of the origin compute node (600) begins the data transfer (721) by reading the data from storage on the origin compute node (600), packetizing the data into network packets and transmitting the data through a data communication network to the target compute node (601). In the example of FIG. 7, the remote get message (719) specifies using a direct put operation to transfer the data so that the processing core (164) on the target compute node (601) is only minimally involved in storing the data on the target compute node (601).

The application messaging module (160) on the target compute node (601) continues administering (710) the data transfer (721) in the method of FIG. 7 by determining (722) whether the data transfer (721) is complete. The application messaging module (160) may determine (722) whether the data transfer (721) is complete according to the method of FIG. 7 by initializing a counter on the target compute node (601) to the size of the data to be transferred and decrementing the counter as the data is received on the target compute node (601). When the counter reaches a value of zero, then the data transfer (721) is complete, and the application messaging module (160) calls a callback function signaling to the target compute node's application that the data transfer (721) is complete. Readers will note that the size of the data to be transferred is typically included in the RTS message (701) transmitted (700) by the origin compute node (600).

The application messaging module (160) on the target compute node (601) also administers (710) the data transfer (721) in the method of FIG. 7 by sending (724) an acknowledgement to the origin compute node (600) using the message primitives if the data transfer (721) is complete. The application messaging module (160) sends (724) an acknowledgement to the origin compute node (600) according to the method of FIG. 7 by invoking an acknowledgement operation of the system messaging module that transmits an ACK message (725) to the origin compute node (600). Upon receiving the ACK message (725), the origin compute node (600) executes callback function signaling to the origin compute node's application that the data transfer (721) is complete.

In the description of FIG. 7 above, readers will note that the application messaging module receives the origin match data from the origin compute node and has to wait to receive the target match data from the target compute node before the data transfer is invoked by the application messaging module. In other embodiments, however, the application messaging module may receives the target match data from the target compute node and have to wait to receive the origin match data from the origin compute node before the data transfer is invoked by the application messaging module. For further explanation, FIG. 8 sets forth a flow chart illustrating a further exemplary method for controlling data transfers from an origin compute node (600) to a target compute node (601) according to the present invention. Similar to the example of FIG. 7, the origin compute node (600) of FIG. 8 includes a processing core (730) and DMA engine (620), and the target compute node (601) of FIG. 8 includes a processing core (164) and DMA engine (197).

Figure 8:
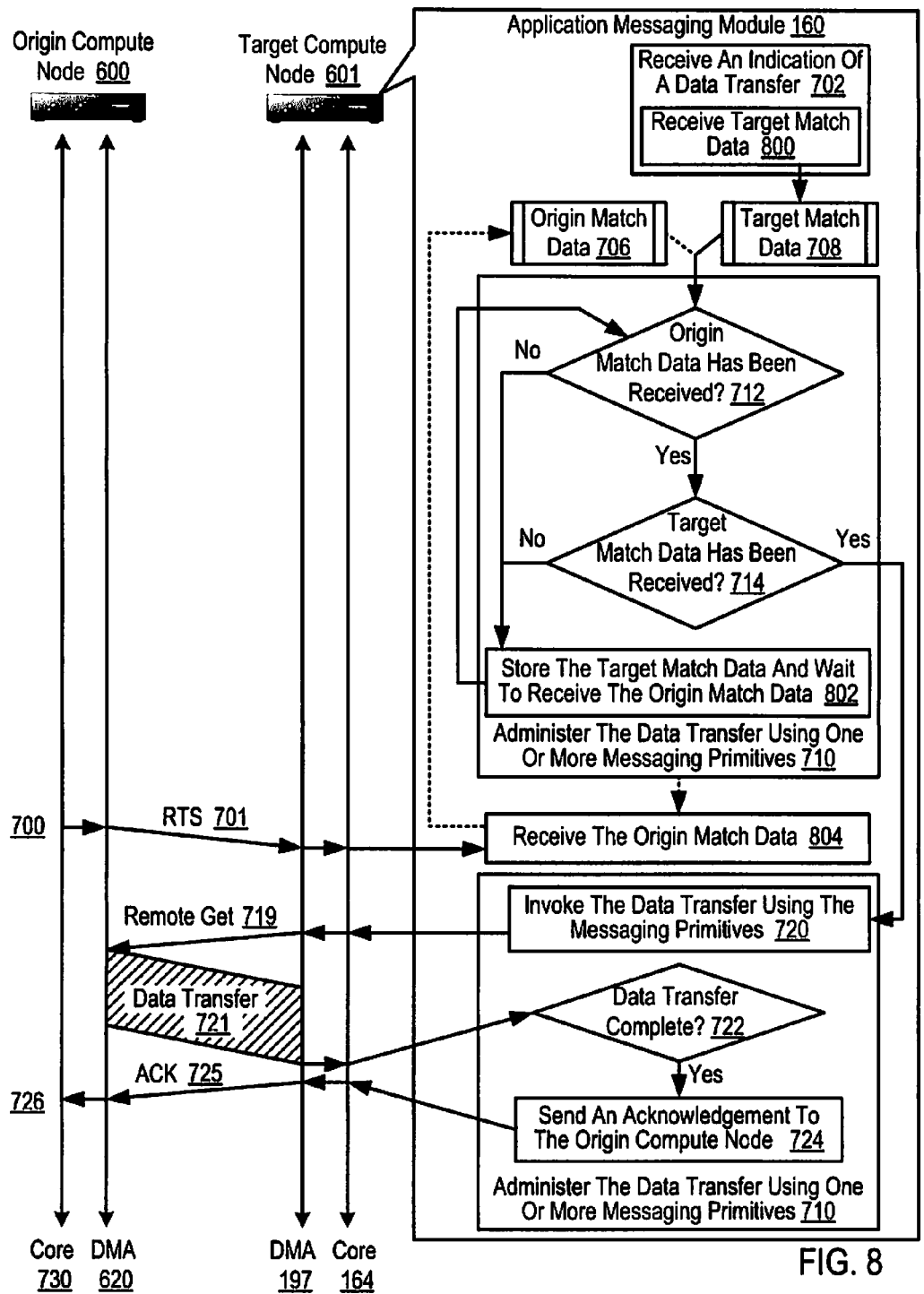
FIG. 8 sets forth a flow chart illustrating a further exemplary method for controlling data transfers from an origin compute node to a target compute node according to the present invention.

The method of FIG. 8 includes receiving (702), by an application messaging module (160) on the target compute node (601), an indication of a data transfer (721) from an origin compute node (600) to the target compute node (601). The application messaging module (160) on the target compute node (601) may receive (702) an indication of a data transfer (721) from an origin compute node (600) to the target compute node (601) according to the method of FIG. 8 by receiving (800) target match data (708) from the origin compute node (601). Receiving (800) target match data (708) from the origin compute node (601) serves as an indication of a data transfer (721) from an origin compute node (600) to the target compute node (601) because the target match data (708) is typically only provided to the application messaging module (160) when an application on the target compute node (601) calls a 'receive' messaging function with the target match data (708) as a parameter. When an application on the target compute node (601) calls a 'receive' messaging function, the application typically expects that another application running on the origin compute node (600) is calling a 'send' messaging function to initiate a data transfer. In fact, the application messaging module (160) receives (800) the target match data (708) from the origin compute node (601) according to the method of FIG. 8 as a parameter to the 'receive' messaging function called by the target compute node's application.

Readers will note that at this point in the method of FIG. 8, the target match data (708) has been received in the application messaging module (160) of the target compute node (601). As indicated by the dotted arrows, however, the origin match data (706) has not yet been received in the application messaging module (160) on the target compute node (601) at this point in the method of FIG. 8 because the application on the origin compute node (600) has not yet called the 'send' messaging function, which results in the origin compute node (600) transmitting (700) an RTS message (701) to the target compute node (601) which specifies both the origin match data and the location on the origin compute node (601) at which the data to be transferred is stored.

The method of FIG. 8 includes administering (710), by the application messaging module on the target compute node (601), the data transfer (721) using one or more messaging primitives of a system messaging module in dependence upon the indication. The application messaging module (160) on the target compute node (601) administers (710) the data transfer (721) in the method of FIG. 8 by determining (712) whether the origin match data (706) has been received by the application messaging module (160) on the target compute node (601) and determining (714) whether the target match data (708) has been received by the application messaging module (160) on the target compute node (601) in a manner similar to the method of FIG. 7 described above.

If the origin match data (706) has not been received by the application messaging module and the target match data (708) has been received by the application messaging module, the application messaging module (160) on the target compute node (601) administers (710) the data transfer (721) in the method of FIG. 8 by storing (802) the target match data (708) on the target compute node (601) and waiting to receive the origin match data (706). The application messaging module (160) may store (802) the target match data (708) in a pending transfer queue along with the information describing the location on the target compute node (601) at which the data to be transferred is to be stored while the application messaging module (160) waits to receive the origin match data (706) from the origin compute node (600).

After some time passes, the method of FIG. 8 continues with receiving (804), by the application messaging module (160), the origin match data (706) from the application on the target compute node (601). Again, the application messaging module (160) may receive (804) the origin match data (706) in a Request To Send ('RTS) message (701). The RTS message (701) of FIG. 8 is a control message indicating that the origin compute node (600) has data to transfer to the target compute node (601). The RTS message (701) is transmitted (700) by the origin compute node (600) to the target compute node (601) in response to an application on the origin compute node (600) calling a 'send' messaging function to transfer data to an application on the target compute node (601). The 'send' messaging function specifies the origin match data (706) along with other information describing the location on the origin compute node (600) of the data to be transferred to the target compute node (601).

The remainder of the method of FIG. 8 operates in a manner similar to the method of FIG. 7. The application messaging module (160) on the target compute node (601) administers (710) the data transfer (721) in the method of FIG. 8 by invoking (720) the data transfer (721) from the origin compute node (600) to the target compute node (601) using the messaging primitives, determining (722) whether the data transfer (721) is complete, and sending (724) an acknowledgement to the origin compute node (600) using the message primitives if the data transfer (721) is complete.

Exemplary embodiments of the present invention are described largely in the context of a fully functional computer system for controlling data transfers from an origin compute node to a target compute node. Readers of skill in the art will recognize, however, that the present invention also may be embodied in a computer program product disposed on computer readable media for use with any suitable data processing system. Such computer readable media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A computer-implemented method of controlling data transfers from an origin compute node to a target compute node, the method comprising:
   receiving, by an application messaging module on the target compute node, an indication of a data transfer from an origin compute node to the target compute node; and
   administering, by the application messaging module on the target compute node, the data transfer using one or more messaging primitives of a system messaging module in dependence upon the indication, including:
   determining, by the application messaging module on the target compute node, whether origin match data has been received by the application messaging module on the target compute node;
   determining, by the application messaging module on the target compute node, whether target match data has been received by the application messaging module on the target compute node;
   if the origin match data has been received by the application messaging module and the target match data has been received by the application messaging module, invoking the data transfer from the origin compute node to the target compute node using the messaging primitives;
   if the origin match data has been received by the application messaging module and the target match data has not been received by the application messaging module, storing the origin match data on the target compute node and waiting to receive the target match data; and
   if the origin match data has not been received by the application messaging module and the target match data has been received by the application messaging module, storing the target match data on the target compute node and waiting to receive the origin match data.

2. A target compute node that controls data transfers from an origin compute node to a target compute node, the target compute node comprising a computer processor, computer memory operatively coupled to the computer processor, the computer memory having disposed within it computer program instructions that when executed by the computer processor cause the target compute node to function by:
   receiving, by an application messaging module on the target compute node, an indication of a data transfer from an origin compute node to the target compute node; and
   administering, by the application messaging module on the target compute node, the data transfer using one or more messaging primitives of a system messaging module in dependence upon the indication, including:
   determining, by the application messaging module on the target compute node, whether origin match data has been received by the application messaging module on the target compute node;
   determining, by the application messaging module on the target compute node, whether target match data has been received by the application messaging module on the target compute node;
   if the origin match data has been received by the application messaging module and the target match data has been received by the application messaging module, invoking the data transfer from the origin compute node to the target compute node using the messaging primitives;
   if the origin match data has been received by the application messaging module and the target match data has not been received by the application messaging module, storing the origin match data on the target compute node and waiting to receive the target match data; and if the origin match data has not been received by the application messaging module and the target match data has been received by the application messaging module, storing the target match data on the target compute node and waiting to receive the origin match data.

3. A computer program product for controlling data transfers from an origin compute node to a target compute node, the computer program product disposed upon a recordable computer readable medium, the computer program product comprising computer program instructions that when installed upon and executed by the target node cause the target node to function by:

receiving, by an application messaging module on the target compute node, an indication of a data transfer from an origin compute node to the target compute node; and administering, by the application messaging module on the target compute node, the data transfer using one or more messaging primitives of a system messaging module in dependence upon the indication, including:

determining, by the application messaging module on the target compute node, whether origin match data has been received by the application messaging module on the target compute node;

determining, by the application messaging module on the target compute node, whether target match data has been received by the application messaging module on the target compute node;

if the origin match data has been received by the application messaging module and the target match data has been received by the application messaging module, invoking the data transfer from the origin compute node to the target compute node using the messaging primitives;

if the origin match data has been received by the application messaging module and the target match data has not been received by the application messaging module, storing the origin match data on the target compute node and waiting to receive the target match data; and if the origin match data has not been received by the application messaging module and the target match data has been received by the application messaging module, storing the target match data on the target compute node and waiting to receive the origin match data.

* * * * *